United States Patent [19]
Lund et al.

[11] Patent Number: 5,270,728
[45] Date of Patent: Dec. 14, 1993

[54] RASTER IMAGING DEVICE SPEED-RESOLUTION PRODUCT MULTIPLYING METHOD AND RESULTING PIXEL IMAGE DATA STRUCTURE

[75] Inventors: Mark D. Lund; Steven O. Miller, both of Vancouver, Wash.

[73] Assignee: Hewlett-Packard Company, Palo Alto, Calif.

[21] Appl. No.: 686,898

[22] Filed: Apr. 17, 1991

[51] Int. Cl.⁵ .................................................. B41J 2/01
[52] U.S. Cl. ................................ 346/1.1; 346/140 R; 395/108; 400/121
[58] Field of Search .................. 346/1.1, 33 R, 140 R; 395/108, 109; 400/121; 382/55

[56] References Cited

U.S. PATENT DOCUMENTS

| | | | |
|---|---|---|---|
| 5,029,108 | 7/1991 | Lung | 395/109 |
| 5,134,495 | 7/1992 | Frazier | 358/298 |
| 5,149,212 | 9/1992 | Murakami | 400/121 |
| 5,155,503 | 10/1992 | Tasaki | 346/140 R |

FOREIGN PATENT DOCUMENTS

| | | |
|---|---|---|
| 0013296 | 10/1979 | European Pat. Off. . |
| 0144016 | 11/1984 | European Pat. Off. . |
| 0317140 | 11/1988 | European Pat. Off. . |
| 59-109375 | 10/1984 | Japan . |

OTHER PUBLICATIONS

Kitamura, J; Draft Font Generation, IBM Tech. Disc. Bulletin, v. 27, N4B, Sep. 1984, p. 2504.

*Primary Examiner*—Joseph W. Hartary

[57] ABSTRACT

A method for multiplying the speed-resolution product of a raster scanning or imaging device such as an inkjet printer, and a resulting pixel image data structure, are disclosed. Illustratively, a 300-dot per inch (dpi) by 600-dpi logical pixel image is mapped to a corresponding, non-overlapping physical dot image, and the printer's inkjets are fired responsive to the dot image to direct generally spherical ink droplets onto paper at 600-dpi resolution grid timing in order effectively to double the horizontal resolution of the printed pixel image, without increasing the firing rate of the print head. In order to accomplish this, and to avoid ink dot overlap, the printable pixel image is thinned before it is printed by a method that leaves no visible horizontal or vertical gaps by selectively turning off pixels within a 'black' image that were on and that otherwise would result in ink dot overlap and slower print head speeds were the inkjets cycled at 600-dpi resolution timing. Pixel thinning is performed substantially without adversely affecting pixel image edge definition.

8 Claims, 6 Drawing Sheets

RASTER IMAGING DEVICE SPEED-RESOLUTION PRODUCT MULTIPLYING METHOD AND RESULTING PIXEL IMAGE DATA STRUCTURE

TECHNICAL FIELD

This invention relates to a method and data structure for multiplying the speed resolution product of a raster imaging device such as an inkjet printer and, more particularly, to a method that alters a high-resolution logical pixel image to produce a pixel image data structure that is printed by such imaging devices to produce an effectively higher resolution image having excellent conformity in size, shape and edge definition with that which would be produced by a substantially higher cost, higher resolution printer. This is done, e.g. in printer hardware, firmware or software, by mapping the logical pixel image into a printer pixel image, or non-overlapping dot image.

BACKGROUND ART

Raster imaging output devices depict images as a series of on and off pixels within a two-dimensional pixel array (of vertical columns or lines and horizontal rows), referred to herein as a dot matrix, addressed in a dot-serial, raster scanning pattern. Image resolution, and thus clarity, conformity and edge definition, is determined in part by the size of the pixels that make up the image. Some raster imaging output devices have resolutions up to 300-dots per inch (dpi) along a vertical axis and 600-dpi along a horizontal axis, the latter of which conventionally is the raster scan axis. It will be understood that such pixel images may consist of text, graphics or any abstract forms characterized by an instantaneous pixel image defined by whether each pixel is on or off. The higher the resolution of the pixel image, the higher the quality of the output.

One such raster imaging output device is the inkjet printer. An inkjet printer typically has substantially equal vertical and horizontal resolutions, e.g. 300-dpi, due to the round character of individual suspended ink droplets that form the pixel image on paper. Although it is possible to increase the effective resolution of an inkjet printer along the horizontal, raster scan, axis by simply energizing, or firing, the ink jets at a higher rate, such would require substantial head redesign effort and would result in substantially higher cost. It is possible to increase effective resolution by slowing down the rate at which the print head moves relative to the paper, but of course this would result in lower printer throughput. Either attempt to increase raster scan axis resolution would result in the placement of excess ink on the paper due to too much ink droplet overlap.

Most printers inherently have a maximum firing repetition rate, or a minimum cycle time, which if exceeded unduly stresses the print head's electronic and/or mechanical assemblies. Such a maximum refiring rate is one of the factors that determines the resolution of the printer along the raster scan axis. Some printers impose these physical constraints on received pixel image data that would otherwise cause the print head to refire too rapidly. They do so by simply ignoring certain pixel data, e.g. every other on pixel in a given raster scan row of a pixel image might be ignored. Effectively, the horizontal pixel density of the printed output is reduced.

Such techniques reduce the quality of the output of raster output devices. This is because turning off pixels at an image boundary results in undesirably stairstepped or jagged edges, where a smooth edge is desired. Such unintended jagged edges in raster imaging devices will be referred to herein as jaggies. Lower quality also results when logical pixels that happen to be aligned (vertically) in adjacent rows of the pixel image are ignored by the printer, which causes visible, vertical, "white" (or unprinted) gaps, in what should have been a solid "black" (or colored), printed image.

DISCLOSURE OF THE INVENTION

The method of the invention provides for the processing of a logical pixel image having a given (high) horizontal resolution to produce a physical pixel, or dot, image that, when printed on a raster output device such as an inkjet printer having a print head electromechanical configuration that defines a lower horizontal resolution, effectively has the given (high) horizontal resolution. The method involves selectively turning off pixels within the logical pixel image that are on to produce an altered logical pixel image, or pixel data structure, having no overlapping dots and having substantially improved edge definition. This pixel thinning method results in altering the timing when the ink jets are fired to correspond with that of the higher resolution, logical pixel image. In accordance with the preferred method and resulting pixel data structure, visible, vertical gaps in the output, which would result where adjacent rows of turned-off pixels might be (vertically) aligned, are avoided by leaving certain pixels on in accordance with predefined adjacency criteria.

DETAILED DESCRIPTION OF AND BEST MODE FOR CARRYING OUT THE INVENTION

Raster scan output devices, as used herein, will be understood to include without limitation inkjet, thermal and impact printers that form a printed image by a raster scanning process of a pixel image that is received via a printer controller from a computer system. Undesirable constraints on the use of such computer systems would be imposed by a requirement that pixel image data be created with prior knowledge as to the resolution of the output device. Thus, logical pixel image data usually are stored in a predefined high-resolution format. Such logical pixel image data may be processed as necessary by peripheral controllers connected with particular output devices in order to render the pixel data compatible with the resolution and other peculiar requirements of the output devices for which they are destined.

Figure 1:
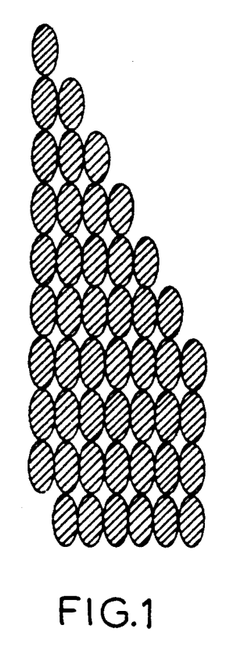
FIG. 1 schematically and in greatly enlarged view shows a logical pixel image that may be processed in accordance with the method of the invention.

Turning first to FIG. 1, a representative, 300-dpi by 600-dpi logical pixel matrix or image is illustrated, with all on pixels defined by ten (horizontal) rows and seven (vertical) lines indicated by shading. The logical pixel image in FIG. 1 is chosen for illustration purposes because it contains features that conventionally have been difficult to accurately reproduce in a limited resolution raster output device. Those skilled in the arts will appreciate that the method of the invention is general, and is effective in multiplying, e.g. doubling, the speed-resolution product of a raster output device in the printing of any high-resolution pixel image.

Figure 2A:
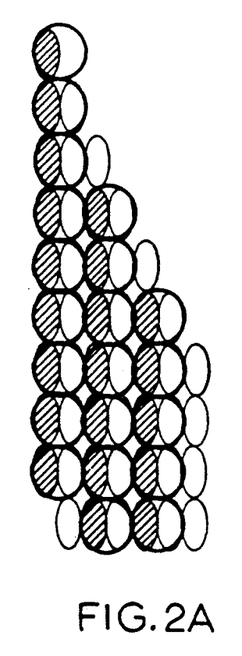
FIGS. 2A and 2B show a logical and physical pixel image corresponding to that of FIG. 1, without processing in accordance with the preferred method of the invention.
Figure 2B:
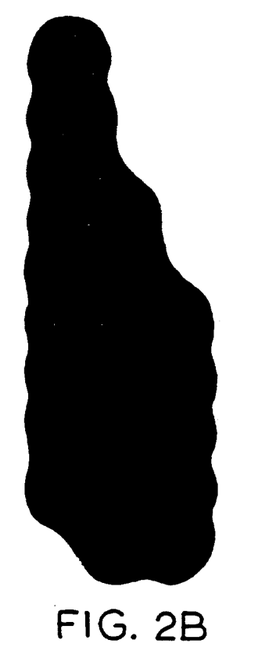

FIGS. 2A and 2B illustrate the effect of, for example, a printer's firing every other pixel in each row of the logical pixel image of FIG. 1. FIG. 2A shows an effective mapping of the high-resolution logical pixel image into a 300-dpi by 300-dpi physical, or printer, dot matrix by grouping row-adjacent logical pixels. FIG. 2B illustrates the printed output that results from conventionally printing the pixel image of FIG. 2A. The lack of size and shape conformity with the original logical pixel image, and the lack of edge definition, are evident. FIG. 2B is illustrative of the effect, described above, of certain printers' disregard for every other pixel in a given row in order to protect the print head's electromechanical assemblies.

Figure 3A:
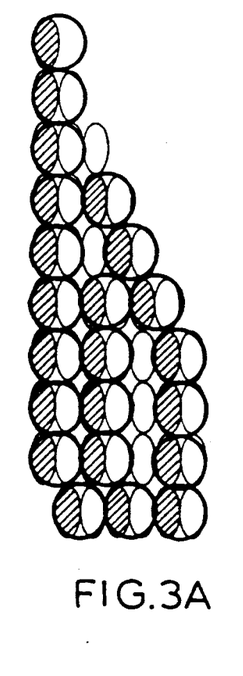
FIGS. 3A and 3B show a logical and physical pixel image corresponding to that of FIG. 1, progressively processed in partial accordance with the preferred method.
Figure 3B:
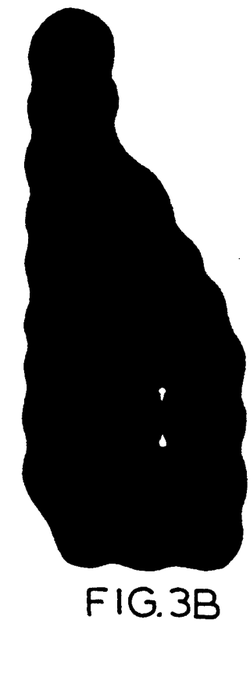

FIGS. 3A and 3B illustrate the pixel thinning process of the method of the invention by which dot overlap is avoided, thus thinning the logical pixel image to produce a thinned printer pixel, or dot, image, by which horizontal resolution is improved by firing the print head to produce a dot the horizontal location of which is based upon the timing of the higher resolution logical image, and by which the edge definition of the original pixel image is preserved by the strategic placement of an pixels one pixel in from the image's right boundary. FIG. 3A illustrates the mapping from the logical pixel image to the printer dot image, wherein selected pixels are turned off and row-adjacent pixels are grouped to represent a printable dot. FIG. 3B illustrates the output of such a partial processing of pixel data, whereby shape conformity to the original pixel data and edge definition are much improved over the process illustrated in FIGS. 2A and 2B. The dumbbell-shaped vertical gap in the output results from a failure of the illustrated pixel thinning process to take into account the fact that row-adjacent, two pixel-wide gaps, or off-pixel areas, in the thinned pixel image of FIG. 3A are vertically aligned.

Pixel thinning a logical pixel image as described above effectively doubles the horizontal resolution of the output image, while permitting the use at nominal firing rates of a conventional inkjet print mechanism. While the print speed, and thus the throughput, remains the same, the effective horizontal resolution is multiplied by the ratio of the original pixel image's higher resolution, e.g. 600-dpi, to the inverse of the printer's limiting, larger dot size, e.g. 300-dpi$^{-1}$. This result is referred to herein as speed-resolution product multiplication. Skilled persons will appreciate that other speed-resolution product multiples can be achieved within the spirit of the invention. For example, a 900-dpi (horizontal) resolution logical pixel image could be thinned, e.g. by turning off row-adjacent pixel pairs between row-adjacent on pixels in the thinned array, and the altered pixel image printed on a conventional inkjet printer having such larger dot size effectively to triple the speed-resolution product.

Figures 4A, 4C:
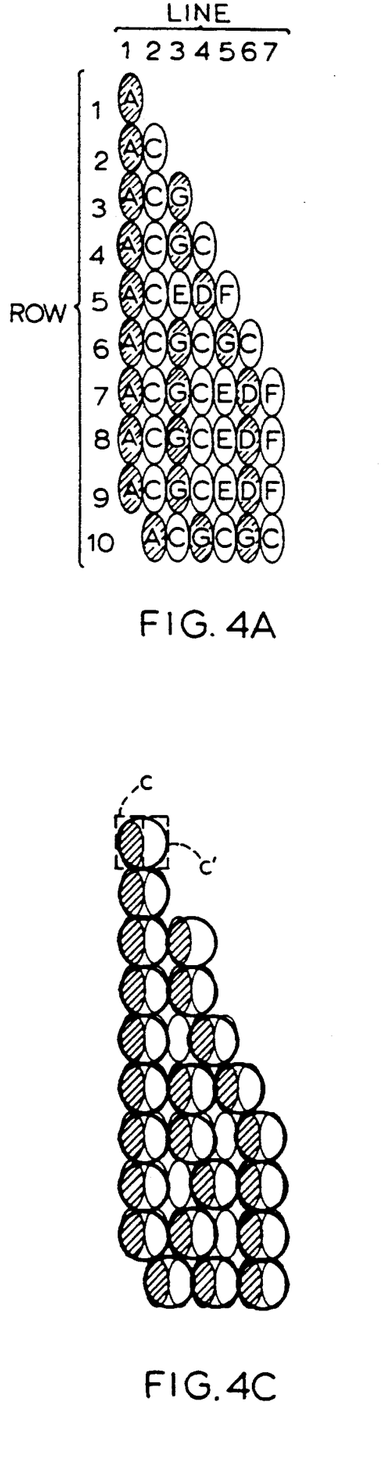
FIGS. 4A through 4D show a logical and physical pixel image corresponding to that of FIG. 1, progressively processed in full accordance with the preferred method of the invention to produce the preferred pixel data structure thereof.
Figures 4B, 4D:
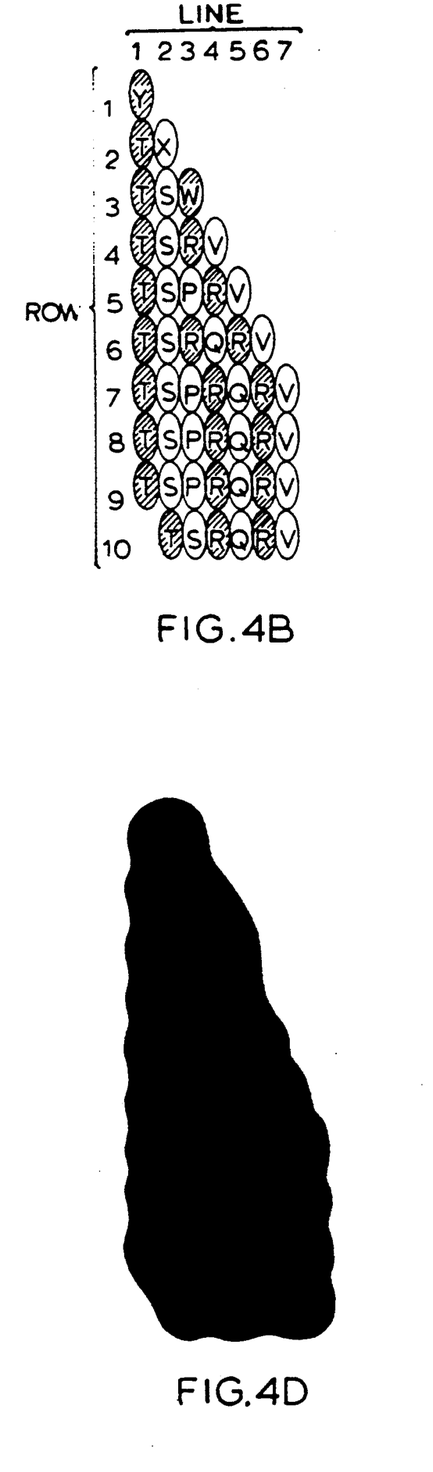

The pixel thinning algorithm upon which the invention depends will be described by reference to FIGS. 1 and 4A through 4D. FIG. 1 illustrates a representative logical pixel image the printing of which is desired using an inkjet printer. The oval pixels are illustrated as defining 300-dpi row (vertical) resolution by 600-dpi line (horizontal) resolution, and all logical pixels in the image are on, as indicated by their shading. FIG. 4A illustrates the effect of left-to-right pixel thinning in partial accordance with the preferred method of the invention, wherein selected ones of the pixels that are on in FIG. 1 are off in FIG. 4A, as indicated by their lack of shading. FIG. 4B illustrates the effect of right-to-left pixel thinning in partial accordance with the preferred method, wherein selected on pixels of FIG. 1 are off. FIG. 4C illustrates the dot image that will be produced by the preferred method, which combines the left-to-right and the right-to-left thinning processes in a manner to be described, wherein dots are indicated by circles that embrace selected, adjacent logical pixels within a given row of the original image. FIG. 4D illustrates the accurate, smooth, 300-dpi by 600-dpi resolution, inkjet printed image that is made possible by use of the pixel thinning, resolution multiplying method of the invention.

It may be seen by comparing FIGS. 1 and 4C that the horizontal resolution of the printed image effectively has been doubled, and that there are no overlapping dots in the resulting printer dot image. It may be seen from FIG. 4D that the edge definition of the printed image is substantially improved over that illustrated in FIGS. 2B and 3B. Indeed, only when there are exactly one or three on pixels in a given row is the edge of the physical pixel image visually distinguishable from that which would be produced by a 300-dpi by 600-dpi printer. Slightly widened rows 1 and 3 represent the difficulty in all instances of mapping a 600-dpi (horizontal) resolution pixel image to a printer dot image without dot overlap. Despite this constraint, it will be appreciated that the pixel thinning, resolution multiplying method of the invention nevertheless provides substantially improved print quality.

Figure 5:
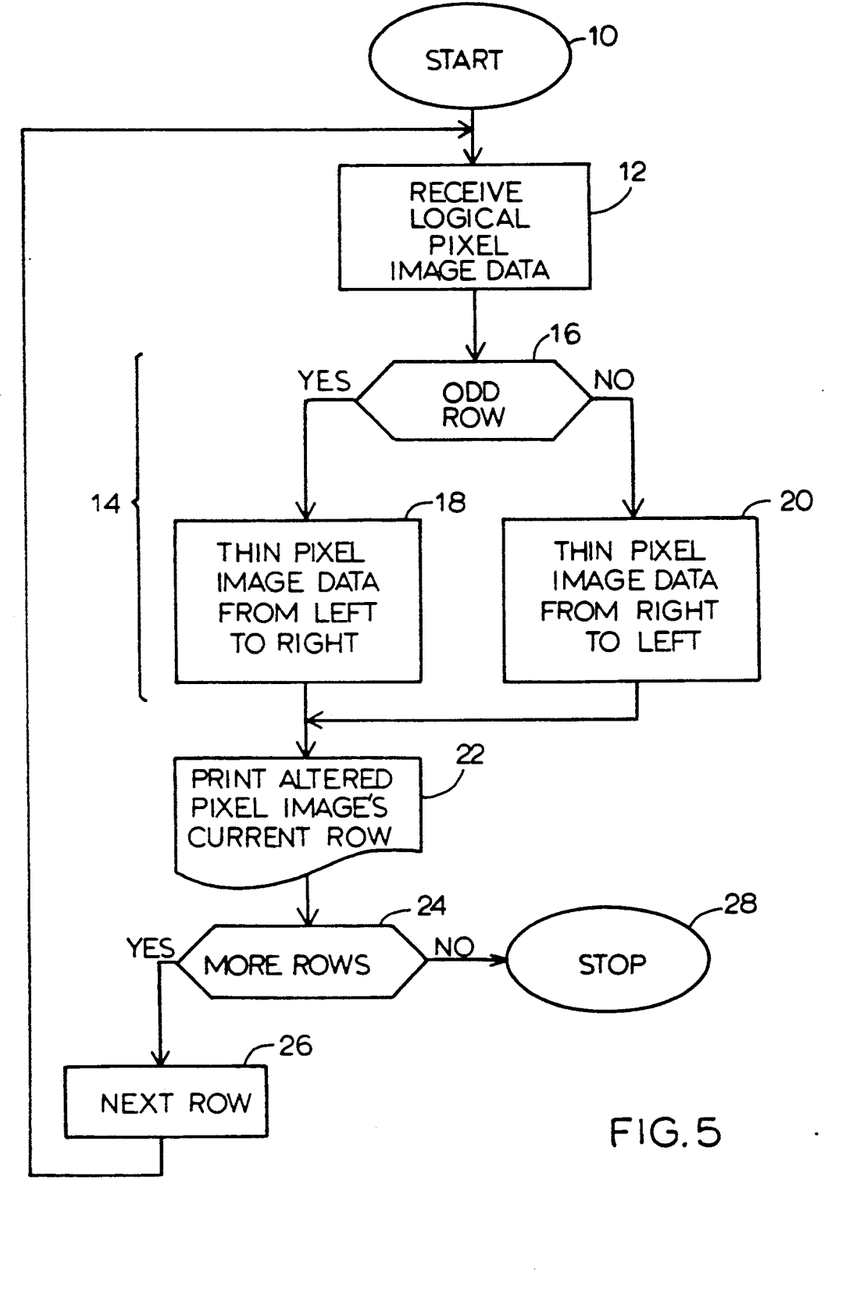
FIG. 5 is an overall flowchart of the preferred method of the invention.

Turning now to FIG. 5, the preferred speed-resolution product multiplying method of the invention, of which pixel thinning is an important part, is described. FIG. 5 is a flowchart of the overall manner in which the preferred method may be implemented in hardware, firmware or software (or a combination thereof). At 12, the printer receives a row of logical pixel image data, which will be understood to represent a portion of a high-resolution, logical pixel image such as that illustrated in FIG. 1. Pixel altering, or bit mapping, step 14, which is indicated by brackets to include steps 16, 18 and 20, maps the logical pixel image into a physical dot image, i.e. it alters the current row of the received pixel image to produce a printable altered pixel image having fewer on pixels than the received pixel image and high resolution that, when actually printed by a pixel 'stretching' raster imaging device, substantially preserves the edge definition of the received pixel image. Such altering step 14 in accordance with the preferred method includes determining at 16 whether the current row is odd or even. If odd, the received pixel image is thinned at 18 from left to right, and, if even, the received pixel image is thinned at 20 from right to left. Those of skill in the arts will appreciate that it is unimportant whether odd or even rows are thinned left to right or right to left, so long as the direction of thinning is reversed between adjacent rows, i.e. the outcomes of decisional step 16 may be reversed or thinning processes 18, 20 may be interchanged from that shown in FIG. 5.

Thinning steps 18, 20 preferably are performed in accordance with the processes to be described in detail by reference to FIGS. 6A, 6B and 7 to produce a thinned pixel image that represents non-overlapping dots located on a high-resolution grid. Such altering step 14 will be understood effectively, selectively to 'shift' an on pixel of the current row if aligned gaps in the current row and the immediately preceding row otherwise would result from such pixel thinning. At 22, the row of the altered pixel image having thinned and, where necessary, effectively 'shifted' pixels, is raster scanned, or printed. At 24 it is determined whether there are more rows to be processed. If so, then the next row of the logical pixel image is selected at 26, e.g. by incrementing array pointers, and another row of logical pixel image data identically is processed. If not, then at 28 pixel data processing STOPs.

It will be appreciated that the received pixel image has a defined resolution along a given axis, e.g. the raster scanning axis, and that the received pixel image has a plurality of on pixels defining at least one edge, or edge region, and an interior image region. The pixel image illustrated in FIG. 1, wherein on pixels indicated by shading define edge and interior regions of an elongated pentagonal image, is merely one example of the virtually limitless pixel images that might be received (which, of course, may be text, graphics or abstract images).

The altering step is performed in accordance with the preferred method of the invention to produce selected on pixels that are spaced apart from one another along the given axis, if at all, then preferably by one or two off pixels, as illustrated in FIGS. 4A and 4B. The altering step also is performed in accordance with the preferred method to produce selected on pixels that are spaced inwardly from an edge region of the received pixel image along the given axis, as illustrated in FIGS. 4A and 4B by the fact that, in all odd rows but rows 1 and 3, the right-most pixels are off. Such selected spacing from one another and inwardly from an edge-defining region of the received pixel image is performed in accordance with predetermined criteria including pixel adjacency and edge proximity criteria, as will be described in detail below by reference to the flowcharts of FIGS. 6A, 6B and 7.

Preferably, the raster scanning step is performed by an inkjet printer the dot size of which is wider than the width of the pixels in the logical pixel array. The mapping of the altered logical pixel array, which is represented by the broad circles embracing row-adjacent pixels in FIG. 4B, to a printable physical pixel, or dot, array may be thought of as involving the 'stretching' of each pixel in the array as it is transferred to the output medium, e.g. paper. In the speed-resolution product doubling method illustrated herein, whereby a 600-dpi (horizontal) resolution pixel image is thinned to produce effectively a 600-dpi (horizontal) resolution image on an inkjet printer, depends upon the 'stretching' of each higher-resolution pixel into a dot of approximately twice the width of the pixel, or substantially to the diameter of an ink dot.

Such pixel 'stretching' might be accomplished on a thermal or impact printer, within the spirit of the invention, by the fact that the stiff wires, for example, that help form the dots on paper in an impact dot matrix printer are generally round in cross section and produce an effective dot diameter larger than the 600-dpi$^{-1}$ pixel width of the original logical pixel image. It is this 'stretching' that, along with the spacing in alternate rows of left-most and right-most on pixels of the altered image inwardly one pixel's width from the edge of the pixel image, results in crisp edge definition in the output, thereby to reproduce the received pixel image at the defined resolution along the raster scan axis.

Altering step 14 and scanning, or printing, step 22 are performed in such manner that any spaces, or gaps, between neighboring on pixels of the altered pixel image are invisible in the reproduced pixel image. In other words, each on pixel of the altered pixel image, which is spaced as much as two off pixels away from a neighboring on pixel (e.g. in FIG. 4C the on pixels in the eighth row, first and fourth lines are spaced apart by two off pixels in the same row, second and third lines), is located closely enough thereto so that, when scanned or printed, there is no visible gap between neighboring on pixels, as illustrated in FIG. 4D. This important feature of the invention depends upon reversing the order, in alternating pixel rows, by which pixels are thinned, in accordance with left-to-right thinning process 18 and right-to-left thinning process 20. Thus, aligned pixel-wide gaps in the dot image are absent (contrast FIGS. 3A and 3B with FIGS. 4C and 4D).

The altering, or mapping, is of pixels located within first cells (e.g. rectangular cell c in FIG. 4C) defined by a high-resolution grid to dots located within second cells (e.g. square cell c′ in FIG. 4C) defined by such high-resolution grid, wherein the second cells are larger than the first cells. Importantly, the pixels of the original logical pixel image that define selected edge regions thereof are mapped to correspond one to one with the dots that will generate a printable dot image, i.e. in accordance with the preferred method each on pixel that defines at least the left and right edge regions (and preferably all edge regions) of the logical pixel image of FIG. 1 is embraced by a circle of FIG. 4C representing a dot to be printed as in FIG. 4D. After such mapping, which importantly preserves the edge definition of the original pixel image while avoiding dot overlap and greater than one logical pixel width's space between adjacent dots, the dot image is raster scanned to fire a hardcopy image-generating means such as an inkjet printer, thereby accurately to reproduce the received pixel image on an output medium, e.g. paper.

It may be seen from FIG. 5 that the mapping of pixels to dots includes the steps of analyzing, in accordance with the algorithm described above, on pixels of a given pixel image row in a prescribed order, e.g. from left to right in odd numbered rows, and turning off selected pixels in corresponding locations of the dot image to produce a non-overlapping dot image row. Preferably, each dot of the resulting dot image row is in one-two-one correspondence with a remaining on pixel of the given pixel image row. Such analyzing and turning off steps of the mapping are repeated in accordance with predetermined pixel adjacency and edge proximity criteria with respect to successive pixel image rows of the received pixel image, but the prescribed order and manner in which the on pixels are analyzed is different for alternate pixel image rows. The result is that undesirable gaps in the printed image are avoided.

Mapping in accordance with preferred method of the invention produces a pixel image data structure that may be described as follows, with reference to FIGS. 4A, 4B and 4C. FIGS. 4A and 4B show inkjet printable pixel images that include orthogonally arrayed on and off pixels (including plural on pixels and plural off pixels). As may be seen, neighboring on pixels within a given row of the inkjet printable pixel image are spaced from one another by no more than two adjacent off pixels. In other words, neighboring on pixels are spaced, if at all, by no fewer than one off pixel and by no more than two adjacent off pixels, leaving no greater than a two pixel wide space, or gap, between any two neighboring on pixels of the given row. Such mapping produces a pixel image data structure capable of being printed without visible gaps in the output in all cases except where the original, logical pixel image has a vertically aligned run of five pixel-wide rows. In the anomalous case in which such a run occurs in the original, logic pixel image, it may be less objectionable to double fire the ink jet to produce overlapping dots in alternate rows than to leave an otherwise unavoidable gap in the output.

By virtue of the different results of the left-to-right and right-to-left pixel thinning processes and the alternate use of the two processes on successive rows, when adjacent off pixels within a row occur they are not in alignment with a similar occurrence in an adjacent row of the pixel image. As may be seen from FIG. 4C, at least one of such two adjacent off pixels, e.g. the adjacent off pixels of the eighth row, second and third lines, has in a first row adjacent thereto an on pixel, e.g. the on pixel of the seventh row, third line. Additionally, one of the two adjacent off pixels within a given row has in a second row adjacent thereto an on pixel, e.g. the on pixel of the ninth row, third line. Thus, while there may be a line of single-wide off pixels in the altered pixel image, there are no vertically aligned adjacent off pixels, or pixel pairs. The preferred method of the invention that involves the reverse directional pixel thinning of rows produces a mapped printable pixel image that, most clearly by reference to FIG. 4C, may be seen to produce only single-wide spaces between adjacent dots within a given row, which spaces do not result in gaps in the printed output when ink droplets are applied to paper.

Because pixel thinning to achieve non-overlapping dots and good edge definition are performed in accordance with pixel adjacency and edge proximity criteria that are localized to the pixel, or bit, under consideration, it is possible to multiply the speed-resolution of raster output devices with minimal rasterized image row buffering. In accordance with the preferred method of the invention, only single rasterized pixel image row buffering is required to render all pixel on-/off decisions affecting dot overlap, inter-dot gap and edge definition. This greatly reduces the pixel data processing complexity and its impact on printer throughput, while avoiding costly multiple row or page buffers in the printer controller or the printer. Such permits substantially on-the-fly pixel image data processing, which can be performed by hardware, firmware or software without substantial data processing latency.

Figure 6A:
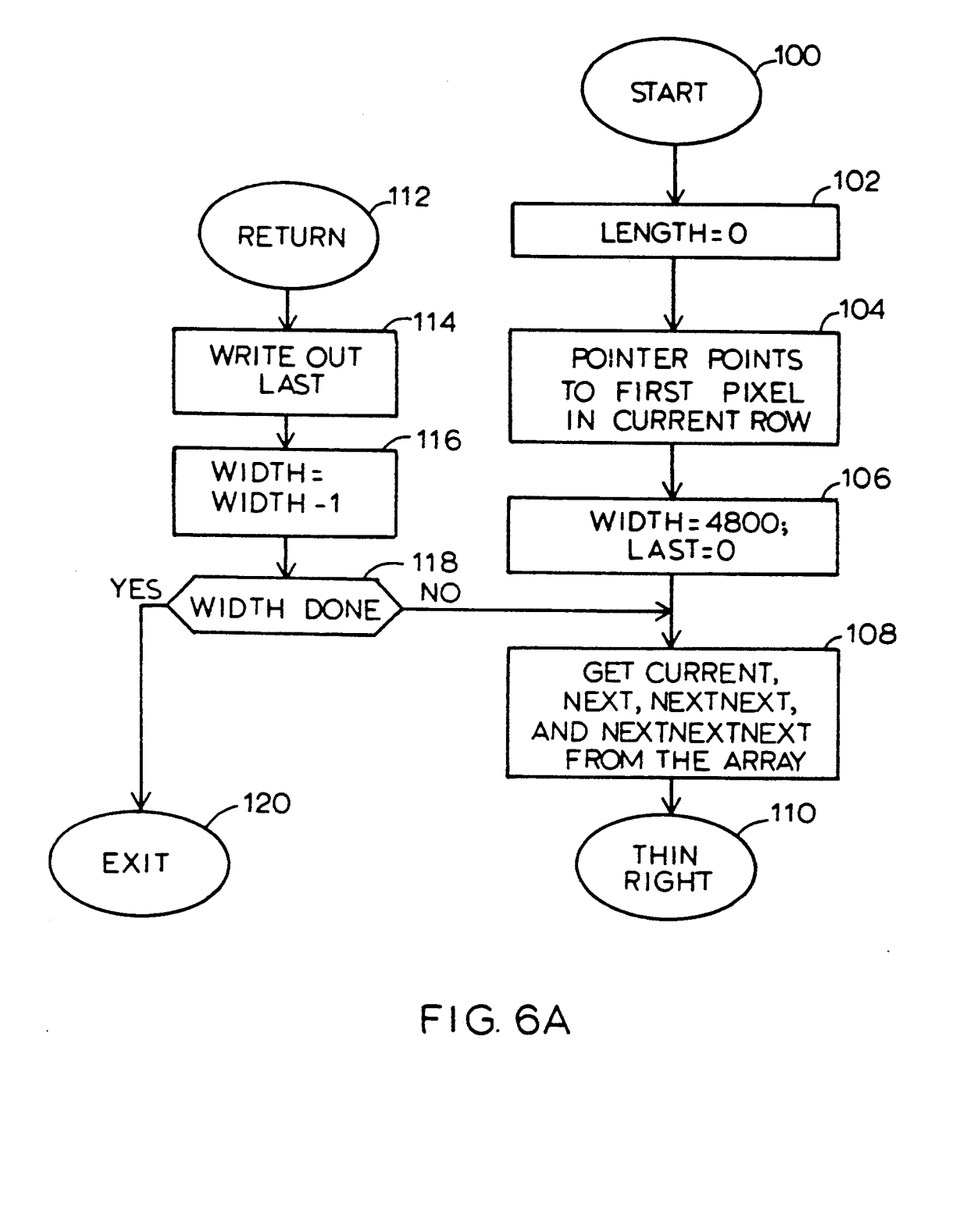
FIGS. 6A and 6B are detailed flowcharts of the left-to-right pixel thinning process illustrated in FIG. 5.
Figure 6B:
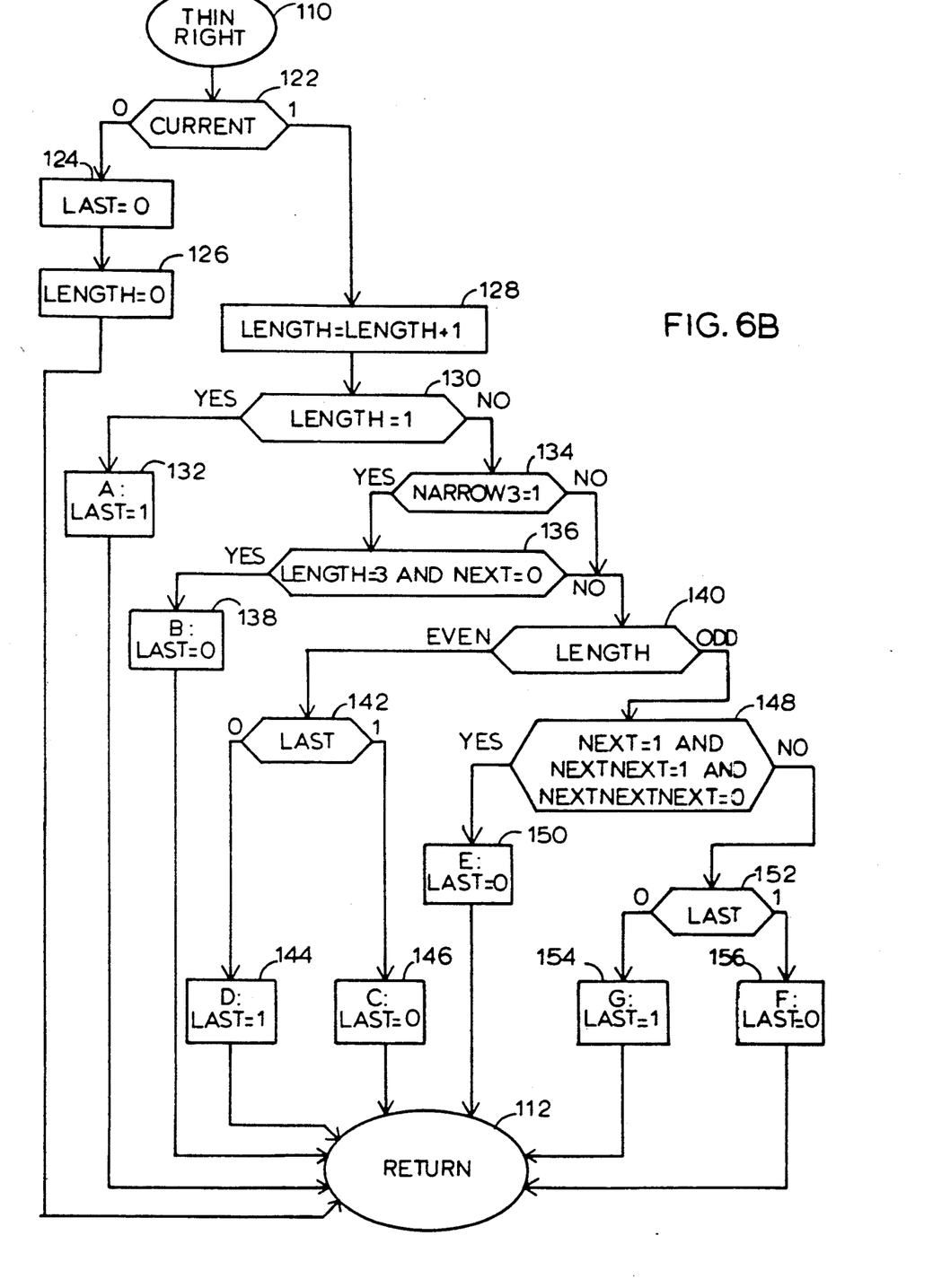

Referring now to FIGS. 6A and 6B, the left-to-right pixel thinning routine may be seen to use various descriptive terms that require definition. "CURRENT" refers to the current logical on pixel being analyzed as to whether it should be turned off in producing the dot image. "LAST" refers to the immediately preceding logical pixel in the current row. "NEXT" refers to the immediately proceeding logical pixel in the current row. "NEXTNEXT" refers to the logical pixel immediately proceeding the NEXT logical pixel in the current row. "NEXTNEXTNEXT" refers to the logical pixel in the current row that immediately follows the NEXTNEXT logical pixel. State variables 'A', 'B', 'C', 'D', 'E', 'F' and 'G' refer to the decision tree termini of the set of logical pixel states that determine whether the current pixel of the logical pixel image will be left on or turned off in the altered pixel image, and all but variable 'B' correspond with identically labeled logical pixels in the pixel image illustrated in FIG. 4A.

For example, pixels labeled A correspond with pixel locations in which the current (horizontal) "LENGTH" of the on logical pixel run is 1, i.e. the pixels labeled A are the first encountered on pixels of the current row of the logical pixel image (when LENGTH is incremented from 0 to 1, the corresponding pixel is treated as an A-type pixel), and such are left in their current (on) state by setting "LAST" high (or to 1, by high-true logic convention). Variable B corresponds with pixel locations in which the current LENGTH of the on logical pixel run is 3 and the NEXT pixel is off. Were it desired to produce only a single dot when such a three pixelwide row is encountered, then a logical switch "NARROW3" would be set to 1 rather than 0 and LAST would be set low (or to 0, by high-true logic convention), or cleared. For purposes of comparing the preferred and alternative pixel thinning methods, turning off, rather than leaving on, a third-in-a-row pixel is illustrated in FIGS. 3A and 3B the result of which may be seen to be a less accurately conforming ink dot image than that illustrated in FIGS. 4C and 4D. By the preferred method of the invention, third-in-a-run pixels instead are left in their current (on) state by setting LAST (high). Whether a third-in-a-run on pixel is left on or turned off may be determined by printer-or application-specific criteria, as its being left on will result in a somewhat widened image and its turning off will result in a somewhat narrowed image.

Pixels labeled C correspond with pixel locations in which the current LENGTH of the on pixel run is even and in which the LAST (immediately preceding) bit is on, and such are turned off by clearing LAST. Pixels labeled D correspond with pixel locations in which the current LENGTH of the on pixel run is even and in which the LAST bit is off, and such are left in their current (on) state by setting LAST. Pixels labeled E correspond with pixel locations in which the current LENGTH of the on pixel run is odd, in which the next two successive bits (NEXT and NEXTNEXT) are on and in which the third bit proceeding the current bit (NEXTNEXTNEXT) is off, and such are turned off by clearing LAST. Pixels labeled F correspond with pixel locations in which the LAST bit is on, the current LENGTH of the on pixel run is odd and either 1) at least one of the next two successive bits (NEXT and NEXTNEXT) is off or 2) the third bit proceeding the current bit (NEXTNEXTNEXT) is on, and such are turned off by clearing LAST. Finally, pixels labeled G correspond with pixel locations in which, regardless of the state of the previous bit, the current LENGTH of the on pixel run is odd and either 1) at least one of the next two successive bits (NEXT and NEXTNEXT) is off or 2) the third bit proceeding the current bit (NEXTNEXTNEXT) is on, and such are left in their current (on) state by setting LAST.

After a current bit is analyzed as above and either left on or turned off, the next bit in the current row identically is analyzed. The result of performing the left-to-right pixel thinning process on every row of the original logical pixel image shown in FIG. 1 is the production of the altered logical pixel image shown in FIG. 4A. Importantly, the altered pixel image of FIG. 4A is thinned, i.e. not all of the on pixels of the original image are on in the altered image. Also, the left and right edges of the original image are altered such that, when printed by an inkjet printer or other pixel 'stretching' raster imaging device, there is no loss of edge definition. The single pixel of row 1 remains on, and, in accordance with the preferred method of the invention in which NARROW3=0, the two edge pixels of row 3 remain on. In all other rows, the left-to-right pixel thinning process results in the turning off of the right-most (edge) pixels.

FIG. 4B shows the effect of right-to-left pixel thinning in accordance with the preferred embodiment of the invention. It may be seen that FIG. 4B is similar to FIG. 4A, but that on and off pixels are differently labeled to correspond with a different thinning algorithm. Importantly, the on pixels that remain in each row are identical with those that result from left-to-right pixel thinning in all rows except rows 7 through 9. It is this important difference that renders alternate row, left-to-right and right-to-left pixel thinning effective in avoiding vertical gaps in the output in such cases as that illustrated in which logical pixel images having vertically aligned rows with odd numbers of pixels (other than five). It will be understood by reference to the overall speed-resolution product multiplying method flowchart of FIG. 5 that the left-to-right pixel thinning process illustrated in FIG. 4A and the right-to-left pixel thinning process illustrated in FIG. 4B alternately are used, in accordance with the preferred method of the invention, to produce an altered pixel image that when printed is substantially free of vertical gaps, as well as being of multiplied resolution and improved edge definition.

FIG. 4C illustrates the transformation of the altered pixel image into a dot image actually processed by an inkjet printer (for example) to produce the image illustrated in FIG. 4D. The ink jets for each row are fired, thus to direct properly spaced ink droplets toward the paper, at a rate that does not exceed the maximum firing, or cycle, rate of the printer, but based upon the timing instead of the 600-dpi resolution of the altered pixel image. While every other or every third pixel in the altered logical pixel image is on, resulting in one or two pixel-wide gaps therein, no gaps appear in the printed output. This is due to a characteristic ~40-percent increase in dot diameter in the transfer of ink to paper (the slight smoothing in and around the images' recusps results from the ink droplets' mutual affinity and the paper's absorbency).

Importantly, alternate rows of the altered pixel image shown in FIG. 4C are produced by pixel thinning first in one direction and then the other. Specifically, the first, third, fifth, seventh and ninth rows are produced by the left-to-right pixel thinning process illustrated in FIG. 4A, whereas the second, fourth, sixth, eighth and tenth rows are produced by the right-to-left pixel thinning process illustrated in FIG. 4B. It may be seen by contrasting FIGS. 3A and 3B with FIGS. 4C and 4D that the preferred pixel thinning method by which alternate rows are thinned in accordance with different pixel row-adjacency criteria avoids visible gaps, or spaces, in the output by alternating left and right the effective placement of certain interior pixels (and thus the dots that embrace them) in adjacent rows which otherwise would produce aligned gaps.

This treatment of adjacent rows is implemented in accordance with the preferred method of the invention in a manner that is described above by reference to the flowchart of FIG. 5. The result of such adjacent row treatment is that no pixel gap in the altered logical pixel image which is wider than a single pixel is permitted to be more than a single pixel high, e.g. would-be visible gaps in the printed output image are avoided by ensuring that any gaps in the altered printer dot image are of only single pixel height. As a result of logical pixel processing in accordance with the preferred method of the invention, no gaps appear in the inkjet printer's output illustrated in FIG. 4D, as might otherwise appear were each row analyzed without regard to the adjacent row alignment of off pixels (e.g. refer to FIG. 3B). It will be appreciated that, in accordance with the preferred method of the invention, such adjacent row gap alignment is avoided by pixel thinning alternate rows in opposite directions, and in accordance with different pixel adjacency and edge proximity criteria, along the raster scanning axis.

Referring again to the flowcharts of FIGS. 6A and 6B, preferred left-to-right pixel thinning process 18 (shown in FIG. 5) will be described in detail. Process 18 begins at start block 100. At 102 LENGTH is set to zero; at 104 "POINTER" is initialized to the first dot in a given row of a logical pixel image; at 106 "WIDTH" is initialized to the number of pixels in each logical pixel image row, e.g. 600-dpi-80-in.=4800 pixels and LAST is cleared. Those of skill in the arts will appreciate that the logical pixel array for a given row must accommodate (at the end of the row) three additional pixels, which must be cleared in order properly to analyze (in view of the NEXT, NEXTNEXT and NEXTNEXTNEXT pixel on/off states) the CURRENT pixel representing the printable pixel image boundary, or the last printable pixel in the row.

At 108 four consecutive pixels, namely CURRENT, NEXT, NEXTNEXT and NEXTNEXTNEXT are obtained from the logical pixel image (row) array. At 110 control is transferred to the start of a "THIN RIGHT" processor illustrated in FIG. 6B. Upon "RETURN" at 112 from the THIN RIGHT processor, LAST is written to the altered pixel image in the CURRENT pixel location at 114. It will be seen that LAST has been either set or cleared by the THIN RIGHT processor in accordance with predetermined pixel adjacency and edge proximity criteria. At 116, 118 WIDTH is decremented and it is determined whether all of the pixels of the current row have been analyzed with respect to left-to-right thinning process 18. If left-to-right thinning process 18 is complete for the current row of the logical pixel image, then left-to-right thinning process 18 is "EXIT"ed at 120 (and the next row is analyzed in accordance with right-to-left thinning process 20, as shown in FIG. 5). Otherwise, left-to-right thinning process 18 continues by updating CURRENT, NEXT, NEXTNEXT and NEXTNEXTNEXT at 108.

Referring next to FIG. 6B, the THIN RIGHT processor begins at 110. At 122 CURRENT is tested. If CURRENT=0, which corresponds to a state in which a pixel of the logical pixel image is off, then the corresponding pixel of the altered pixel image is also turned off by clearing LAST at 124, and LENGTH is cleared at 126 before control is RETURNed at 112. If CURRENT=1 then, which corresponds to a state in which a pixel of the logical pixel image is on, then the corresponding pixel of the altered pixel image is further analyzed with respect to predetermined pixel adjacency and edge proximity criteria. At 128, 130 LENGTH is incremented and it is determined whether it is equal to 1. If LENGTH=1, which corresponds to pixels labeled A in FIG. 4A, then at 132 LAST is set before RETURNing at 112. Thus, pixels of the altered pixel image that correspond to LENGTHs of 1 (which are labeled A) are on, as indicated in FIG. 4A by their shading.

If LENGTH ≠ 1, as determined at decision block 130 of FIG. 6B, then the state of NARROW3 is determined at 134. If NARROW3=1, then it is determined at 136 whether 1) LENGTH=3 and 2) NEXT=0. If both conditions are met then at 138 LAST is cleared, which would correspond with an off pixel in row 3, line 3 of the altered pixel image of FIG. 4A, before control is RETURNed to action block 114 of FIG. 6A. It will be appreciated that, in accordance with the preferred method of the invention, three pixel-wide logical pixel image rows are mapped into two dot-wide printable image rows. Thus, blocks 134, 136, 138 provide flexibility but are not needed by what is believed to be the preferred method, since such right-most pixels G of three pixel-wide rows are instead left on in the altered pixel image. If any of the three conditions tested at 134, 136 is not met then at 140 it is determined whether LENGTH is odd or even. If LENGTH is even then it is determined at 142 whether LAST=0. If LAST=0 then at 144 LAST is set before control is RETURNed. This corresponds with the case of on D pixels shown in rows 5 and 7 through 9 of FIG. 4A. If instead LAST=1 then LAST is cleared at 146 to correspond with C pixels, which may be seen in FIG. 4A to be turned off to produce the left-to-right thinned pixel image.

If it is determined at decision block 140 that LENGTH is odd then at 148 it is determined whether 1) NEXT=1, 2) NEXTNEXT=1 and 3) NEXTNEXTNEXT=0. If all three conditions are met then at 150 LAST is cleared, corresponding with off pixels of FIG. 4A labeled E, and control is RETURNed via 112 to action block 114 of FIG. 6A. If any of the three conditions is not met, then it is determined at 152 whether LAST=0. If LAST=0 then LAST is set at 154 to produce on G-type pixels; if LAST=1 then LAST is cleared at 156 to produce off F-type pixels. Control is RETURNed. Thus, THIN RIGHT processor 110 renders a single pixel on/off determination each time it is invoked and then returns to action block 114 of FIG. 6A for the setting (when LAST=1) or clearing (when LAST=0) of a pixel in the altered pixel image that will be printed by the raster imaging device. It will be appreciated that left-to-right pixel thinning process 18, which is flowcharted in FIGS. 6A and 6B, straightforwardly can be implemented in a hardware 'lookup table', e.g. as a read-only memory- (ROM-) based state controller.

Figure 7:
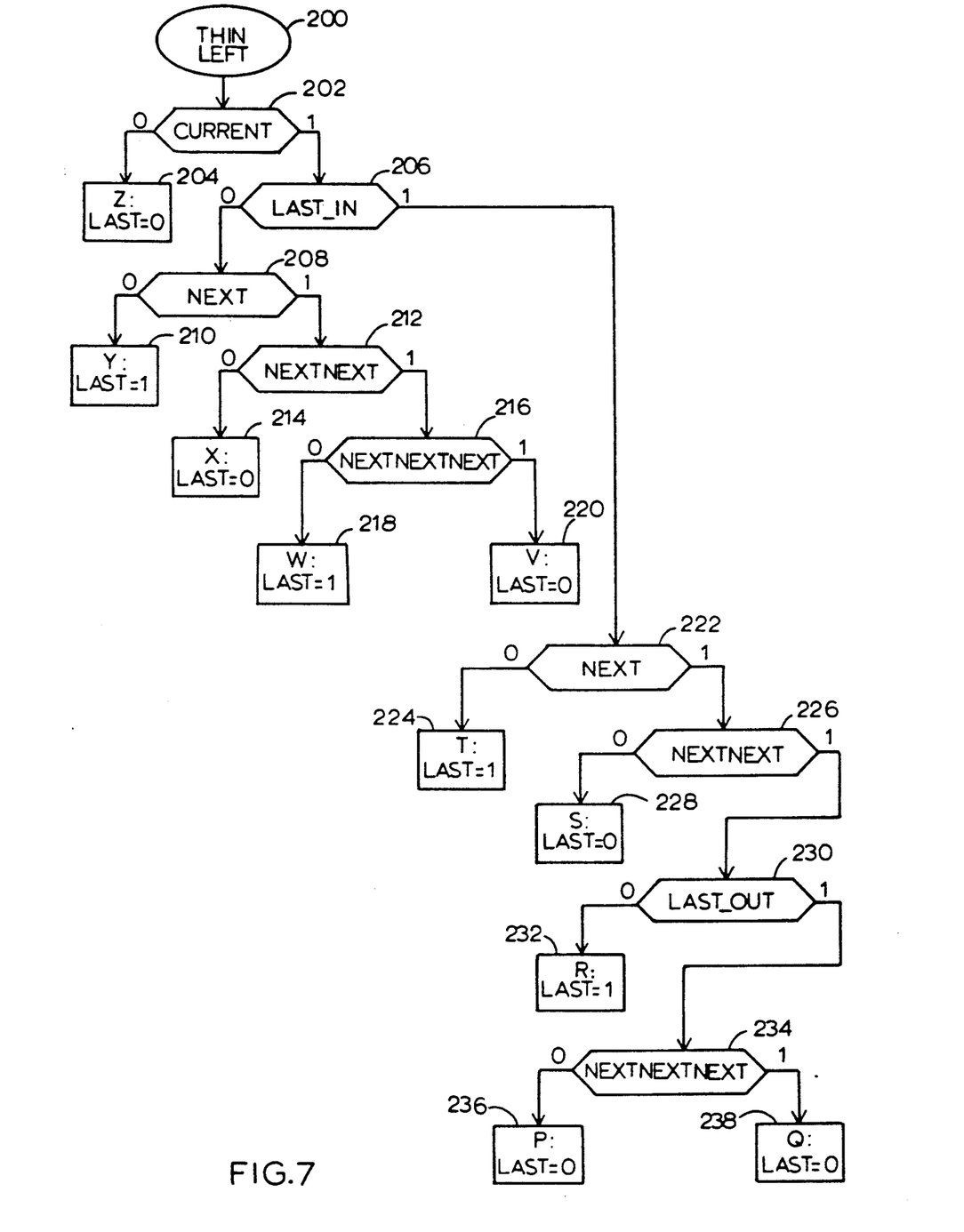
FIG. 7 is a detailed flowchart of the right-to-left pixel thinning process illustrated in FIG. 5.

Referring finally to the flowchart of FIG. 7, right-to-left pixel thinning process 20 (shown in FIG. 5) readily will be understood by its similarities to left-to-right pixel thinning process 18, which is described in detail above. It may be seen from briefly viewing FIG. 7 that a "THIN LEFT" processor 200 corresponds closely with THIN RIGHT processor 100 of FIG. 6B and illustrates the preferred manner in which it is determined whether pixels of the altered pixel image, labeled 'Q', 'R', 'S', 'T', 'V', and 'W' in FIG. 4B, are to be left on or turned off. The label 'U' is intentionally omitted to avoid confusion with 'V'. The label 'Z', which does not appear in FIG. 4B, describes off pixels of the altered pixel image that correspond with off pixels of the original, logical pixel image to be thinned from right to left by the THIN LEFT processor. It will be understood by those of skill that similar variable initialization, array sizing, initialization and management and loop control as are illustrated in FIG. 6A, while required in connection with THIN LEFT processor 200 to effect right-to-left pixel thinning, are not shown for purposes of brevity and clarity. (Such a loop control routine would be identical with FIG. 6A except it would call THIN LEFT, rather than THIN RIGHT, and the "first" pixel of the current row to which the pointer points would be the right-most, rather than the left-most, pixel.)

Briefly, THIN LEFT processor 200 tests CURRENT at 202 and, if it is zero, at 204 clears LAST, which represents the pixel of the altered pixel image to be turned on or off. If CURRENT=1 then at 206 "LAST_IN", a variable representing the pixel of the original, logical pixel image immediately preceding (to the right of) the current pixel, is tested. If LAST_IN=0 then at 208 it is determined whether NEXT=0, in which one pixel-wide row case labeled Y in FIG. 4B LAST is set at 210 to produce an on pixel in the altered pixel image. If NEXT=1 and NEXTNEXT=0 as determined at 212 then at 214 the first encountered pixel in a row of two (labeled X) is turned off by clearing LAST. If 1) NEXT=1,2) NEXTNEXT=1 and 3) NEXTNEXTNEXT=0 as determined at 216 then the first encountered (right-most) pixel in a three pixel row (labeled W) is turned on by setting LAST at 218. If NEXT=1 and NEXTNEXT=1 and NEXTNEXTNEXT=1 then the current row is more than three pixels wide and the first encountered pixel in such a row, labeled V in FIG. 4B, is turned off at 220 by clearing LAST.

If it is determined at 206 that LAST_IN=1, then the row is more than a single pixel wide and the current pixel is an interior or trailing (left) edge pixel. In this case, it is determined at 222 whether NEXT=0. If NEXT=0 then at 224 LAST is set to produce an on pixel T as the last encountered in a given row, as shown in FIG. 4B. If NEXT=0 then an interior pixel is indicated. Accordingly, at 226 NEXTNEXT is tested. If NEXTNEXT=0 then at 228 an S-type pixel is turned off by clearing LAST. If NEXTNEXT=1 then at 230 it is determined whether the immediately preceding pixel of the altered pixel image (that just written to the output pixel array), "LAST_OUT", was on or off. If LAST_OUT=0 then at 232 an R-type pixel is turned on, as illustrated in FIG. 4A, by setting LAST. If LAST_OUT=1 then at 234 NEXTNEXTNEXT is tested. If NEXTNEXTNEXT=0 then at 236 a P-type pixel is turned off by clearing LAST. Otherwise, a Q-type pixel is indicated and LAST is cleared at 238 to turn off the pixel in the altered pixel image. (It will be understood that after setting or clearing LAST, control would be returned to a loop control routine nearly identical to that of FIG. 6A).

It will be understood that other left-to-right and right-to-left pixel thinning processes may be used to produce thinned pixel patterns that, when alternated, produce the desired non-overlapping dot-defining thinned pixel array having multiplied resolution, improved edge definition and a low incidence of visible gaps in the output. It also will be appreciated that the illustrated processes may be differently implemented yet to achieve many of the advantages of the invention. For example, left-to-right or right-to-left pixel thinning and buffering of two or more adjacent pixel rows may be performed, and then the resulting thinned image adjusted, e.g. in accordance with inter-row off pixel adjacency criteria, to avoid vertically aligned off pixel pairs. Finally, it will be appreciated that the processes may be implemented in hardware, firmware, software, or a combination thereof, depending upon the desired processing speed, complexity and cost. The pixel data structure produced by such thinning processes may, within the spirit of the invention, take a different form that nevertheless minimizes the incidence of visible vertical gaps in the output of an inkjet printer or other raster imaging device.

Industrial Applicability

The method and resulting data structure of the invention enable inkjet printers to operate at a multiplied speed-resolution product. By mapping a logical pixel image to a physical pixel image representing printable dots of greater extent than the logical pixels along a raster scanning axis, or by thinning the pixel image to avoid printed ink droplet overlap and vertical gaps while maintaining good edge definition, the method of the invention produces a dot image having non-overlapping dots located on the high-resolution grid, thereby effectively increasing the horizontal resolution without resort to exotic and costly print head technologies and without adverse printer throughput consequences.

The method is not limited to mapping 300-dpi by 600-dpi resolution logical pixel images to physical dot images wherein the dots' extents along the raster scanning axis define a 300-dpi resolution but where the dots are placed on a 300-dpi by 600-dpi resolution grid, which illustrative method effectively doubles the speed-resolution product of the raster imaging device. Those of skill will appreciate that the method is adaptable to any mapping that multiplies the speed-resolution product, for example, whereby the ratio between a given logical pixel image resolution and the resolution defined by a physical raster scan output device's dot size becomes the factor by which pixels in the original image are thinned along the raster scanning axis in an interior region and spaced preferably alternatingly inwardly from the left-most and right-most edges in edge regions thereof by turning selected on pixels off. The result is a pixel data structure that produces, when inkjet printed, a non-overlapping, high-resolution image having no visible interior gaps and having excellent edge definition.

While the preferred method of the invention and a resulting data structure, as well as the best mode for carrying out the invention, have been described, variations may be made without departing from the spirit of the invention.

We claim:

1. An imaging speed-resolution product multiplying method comprising:

receiving a pixel image having a defined resolution along a given axis, with the pixel image having a plurality of on pixels defining edge and interior image regions;

altering the received pixel image to produce an altered pixel image having fewer on pixels than such received pixel image, selected ones of the on pixels of the altered pixel image being spaced along such given axis from one another and inwardly from an edge defined by such received pixel image in accordance with predetermined criteria which include on pixel adjacency and edge proximity criteria; and raster scanning such altered pixel image in such manner that each pixel within the altered pixel image is stretched along such given axis, thereby visibly accurately to reproduce such received pixel image at such defined resolution.

2. The method of claim 1 wherein said altering and said scanning are performed in such manner that spaces between neighboring on pixels of such altered pixel image are not visible in the reproduced pixel image.

3. The method of claim 1 wherein said scanning is performed by an inkjet printer whereby each pixel within the altered pixel image is stretched substantially to the diameter of an ink dot in the reproduction of such received pixel image.

4. The method of claim 3 wherein the inkjet printer produces an ink dot the size of which defines a second resolution along the given axis of approximately half the defined resolution, and wherein said altering is performed in such manner that such selected ones of the on pixels are spaced along such given axis from one another by one or two off pixels and inwardly from such edge region along such axis by one off pixel, thereby effectively doubling the speed-resolution product.

5. For use with a raster imaging device, a speed-resolution product multiplying method comprising:

receiving a pixel image comprising a plurality of on pixels defining edge and interior image regions, with the pixels being located within first cells defined by a grid having a predetermined resolution along a given axis;

mapping the received pixel image to a dot image comprising dots located within second cells defined by such grid wherein such second cells are larger than such first cells, said mapping being performed in such manner that adjacent dots are non-overlapping relative to one another and are spaced from one another along the given axis by no more than the distance between adjacent lines of such grid, such mapping being performed further in such manner that each of the on pixels within such edge defining region is one to one with a corresponding dot;

firing a hardcopy image-generating means by raster scanning such dot image, thereby to produce said received pixel image on an output medium.

6. The method of claim 5, wherein said firing is of an inkjet printer.

7. The method of claim 5 wherein said mapping includes the steps of analyzing on pixels of a given pixel image row in a prescribed order and turning off selected pixels in corresponding locations to produce a dot image row containing dots each of which is in one-to-one correspondence with a remaining on pixel of the given pixel image row, said analyzing and turning off being performed in accordance with predetermined criteria.

8. The method of claim 7, wherein said analyzing and turning off steps are repeated in accordance with such predetermined criteria with respect to successive pixel image rows of the received pixel image, wherein such prescribed order in which such on pixels are analyzed is reversed for alternate pixel image rows.

* * * * *